United States Patent
Bessette

(10) Patent No.: US 7,832,617 B2
(45) Date of Patent: Nov. 16, 2010

(54) ADAPTER ASSEMBLY AND METHOD OF MANUFACTURE

(75) Inventor: Tyler Jon Bessette, Milford, CT (US)

(73) Assignee: Ashcroft, Inc., Stratford, CT (US)

( * ) Notice: Subject to any disclaimer, the term of this patent is extended or adjusted under 35 U.S.C. 154(b) by 585 days.

(21) Appl. No.: 11/731,393

(22) Filed: Mar. 30, 2007

(65) Prior Publication Data

US 2008/0237307 A1 Oct. 2, 2008

(51) Int. Cl.
*B23K 31/00* (2006.01)
*G01L 19/04* (2006.01)

(52) U.S. Cl. .............. 228/135; 73/40.5 R; 73/708; 73/756; 228/140

(58) Field of Classification Search .......... 228/135, 228/140; 73/715, 716, 717, 718, 719, 720, 73/741, 742, 743, 756, 708, 753, 40.5 R; 219/137 R
See application file for complete search history.

(56) References Cited

U.S. PATENT DOCUMENTS

| | | | | |
|---|---|---|---|---|
| 4,384,490 A | * | 5/1983 | Bissell | 73/741 |
| 4,543,833 A | * | 10/1985 | Ferguson | 73/741 |
| 4,753,112 A | | 6/1988 | Wetterhorn | |
| 4,876,894 A | * | 10/1989 | Heller et al. | 73/756 |
| 4,939,338 A | | 7/1990 | Bregy | |
| 6,485,846 B1 | * | 11/2002 | Zheleznyakov et al. | 428/671 |
| 6,679,122 B2 | | 1/2004 | Blake | |
| D543,476 S | | 5/2007 | Barmettler | |
| D545,707 S | | 7/2007 | Barmettler | |
| 2002/0029456 A1 | | 3/2002 | Geissler et al. | |
| 2002/0121304 A1 | | 9/2002 | Moore, Jr. et al. | |
| 2004/0007075 A1 | * | 1/2004 | Ishiguro et al. | 73/715 |
| 2004/0159157 A1 | * | 8/2004 | Sherman et al. | 73/708 |
| 2007/0051167 A1 | * | 3/2007 | Finley | 73/40.5 R |

OTHER PUBLICATIONS

PCT International Search Report dated Jun. 30, 2008.

* cited by examiner

*Primary Examiner*—Roy King
*Assistant Examiner*—Michael Aboagye
(74) *Attorney, Agent, or Firm*—McCarter & English, LLP

(57) ABSTRACT

A method of welding an adapter fitting to a fitting on a measuring device system. The present disclosure also provides for a measuring device system having a first fitting that includes a stem, a second fitting that defines an opening sized to receive the first fitting, where the second fitting also defines an abutment face, wherein the second fitting is positioned around the first fitting with the abutment face abutting an outward end of the first fitting, and where at least one weld secures the first fitting to the second fitting.

12 Claims, 3 Drawing Sheets

ADAPTER ASSEMBLY AND METHOD OF MANUFACTURE

BACKGROUND

1. Technical Field

The present disclosure relates to an adapter assembly and method for fabricating adapter assemblies and, more particularly, to a method for fabricating a threaded adapter in cooperation with an underlying threaded fitting as part of or for use with a measuring device, e.g., a pressure gauge.

2. Background Art

Measuring devices, such as instruments and gauges used for measuring temperature and pressure, have innumerable uses in industry. Price competition between the various manufacturers is a factor in the marketplace. Therefore, a savings in the cost of material, labor and the like by a manufacturer can have a significant effect on that manufacturer's sales, market share and margins. Therefore, a constant need exists among these manufacturers to develop more cost effective manufacturing techniques.

For example, pressure gauges to measure the pressure of process media are well known. Pressure gauges are useful in a myriad of different environments for commercial and industrial applications. Typically, pressure gauges measure pressure and provide an indication of the value. Pressure values are usually displayed in analog form (e.g., by a pointer) or in digital form (e.g., by an electronic readout).

Measuring devices, e.g., pressure gauges, sometimes include a socket fitting by which they may be detachably coupled to a vessel or system for pressure measurements with respect to the contents thereof. Typically, threads are formed on the outward end of the socket fitting for coupling and uncoupling the socket fitting and associated pressure gauge to the vessel/system, e.g., a tank, pipe, reactor or the like. For example, many gauges include ¼ inch NPT threads on the socket fitting for interaction with a threaded aperture or alternative threaded receptor.

However, in some cases, industrial applications are designed to accommodate gauge fittings of differing thread gauges, e.g., a ½ inch NPT thread vs. a ¼ inch NPT thread. In such circumstances, the pressure gauge must be designed to provide an appropriately dimensioned NPT thread on the socket fitting. Typically, suppliers that desire to meet varying industrial needs manufacture products having a socket fitting for each desired thread dimension. Thus, to satisfy customer requirements, the typical measuring device manufacturer has been required to maintain an inventory of the same products, e.g., the same pressure gauge, with different socket fittings that feature different thread dimensions.

In manufacturing socket fittings of different size/dimension, manufacturers generally fabricate/source tubular materials of different outer diameters and machine the requisite thread into the outer surface thereof. To the extent different socket fittings are fabricated for attachment to a single pressure gauge design, significant inefficiencies result. For example, to accommodate different sized socket fittings, design changes are generally required with respect to the underlying gauge, e.g., the gauge housing may require a larger aperture and/or deeper cavity to receive a larger socket fitting. Conversely, smaller socket fittings may require apertures of reduced size/depth. Thus, not only are different sized fittings required, but a different bill-of-materials may be implicated for the associated pressure gauge housing/assembly. These design and manufacturing differences have a significant impact on the manufacturing process and the cost of inventory. Indeed, the need to maintain separate component inventories for pressure gauges differing only in socket fitting dimension is highly inefficient and costly.

These and other inefficiencies and opportunities for improvement are addressed and/or overcome by the assemblies and methods of the present disclosure.

SUMMARY

The present disclosure provides an advantageous adapter assembly and method for fabricating advantageous adapter assemblies. In exemplary embodiments, the present disclosure provides a threaded adapter assembly and method for fabricating a threaded adapter in cooperation with an underlying threaded fitting as part of or for use with a measuring device, e.g., a pressure gauge.

The present disclosure provides for a measuring device system including a first fitting of a first measuring device that includes a stem, a second fitting defining an opening sized to receive the first fitting, the second fitting defining an abutment face, wherein the second fitting is positioned around the first fitting with the abutment face abutting an outward end of the first fitting, and at least one weld securing the first fitting to the second fitting.

The present disclosure also provides for a measuring device system wherein the stem of the first fitting further includes external threads. The present disclosure also provides for a measuring device system wherein the second fitting further includes internal threads that threadably engage with the external threads of the stem of the first fitting. The present disclosure also provides for a measuring device system wherein the second fitting further includes external threads.

The present disclosure also provides for a measuring device system wherein the at least one weld securing the first fitting to the second fitting is caused by Tungsten Inert Gas ("TIG") welding. The present disclosure also provides for a measuring device system wherein the at least one weld securing the first fitting to the second fitting is caused by welding without a filler or insert material operatively associated with the weld.

The present disclosure also provides for a measuring device system wherein the first measuring device is a pressure measuring device. The present disclosure also provides for a measuring device system wherein the first measuring device is a temperature measuring device.

The present disclosure also provides for a measuring device system wherein the stem further includes a gasket, wherein the gasket forms a seal between the first fitting and the second fitting. The present disclosure also provides for a measuring device system wherein the gasket is an O-ring.

The present disclosure also provides for a method for manufacturing a measuring device system, including providing a first fitting of a first measuring device that includes a stem, providing a second fitting defining an opening sized to receive the first fitting, the second fitting defining an abutment face, positioning the second fitting around the first fitting with the abutment face of the second fitting abutting an outward end of the first fitting, and welding the first fitting to the second fitting, thereby securing the first fitting to the second fitting with at least one weld.

The present disclosure also provides for a method for manufacturing a measuring device system, wherein the stem of the first fitting further includes external threads. The present disclosure also provides for a method for manufacturing a measuring device system, wherein the second fitting further includes internal threads that threadably engage with the external threads of the stem of the first fitting. The present disclosure also provides for a method for manufacturing a measuring device system, wherein the second fitting further includes external threads.

The present disclosure also provides for a method for manufacturing a measuring device system, wherein welding the first fitting to the second fitting is caused by Tungsten Inert Gas ("TIG") welding. The present disclosure also provides for a method for manufacturing a measuring device system, wherein welding the first fitting to the second fitting is caused by welding without a filler or insert material operatively associated with the weld.

The present disclosure also provides for a method for manufacturing a measuring device system, wherein the first measuring device is a pressure measuring device. The present disclosure also provides for a method for manufacturing a measuring device system, wherein the first measuring device is a temperature measuring device.

The present disclosure also provides for a method for manufacturing a measuring device system, wherein the stem further includes a gasket, wherein the gasket forms a seal between the first fitting and the second fitting. The present disclosure also provides for a method for manufacturing a measuring device system, wherein the gasket is an O-ring.

The present disclosure also provides for a measuring device system including a first fitting of a first measuring device that includes a stem, the stem including external threads, a second fitting defining a cylindrical opening sized to receive the first fitting, the second fitting defining an abutment face, and wherein the second fitting includes external threads, wherein the second fitting is positioned around the first fitting with the abutment face abutting an outward end of the first fitting, and at least one weld securing the first fitting to the second fitting.

The present disclosure also provides for a measuring device system wherein the external threads of the stem are ¼ inch NPT threads, and wherein the external threads of the second fitting are ½ inch NPT threads.

BRIEF DESCRIPTION OF THE DRAWINGS

To assist those of ordinary skill in the art in making and using the disclosed systems and methods, reference is made to the appended figures, wherein.

DETAILED DESCRIPTION

Figure 1:
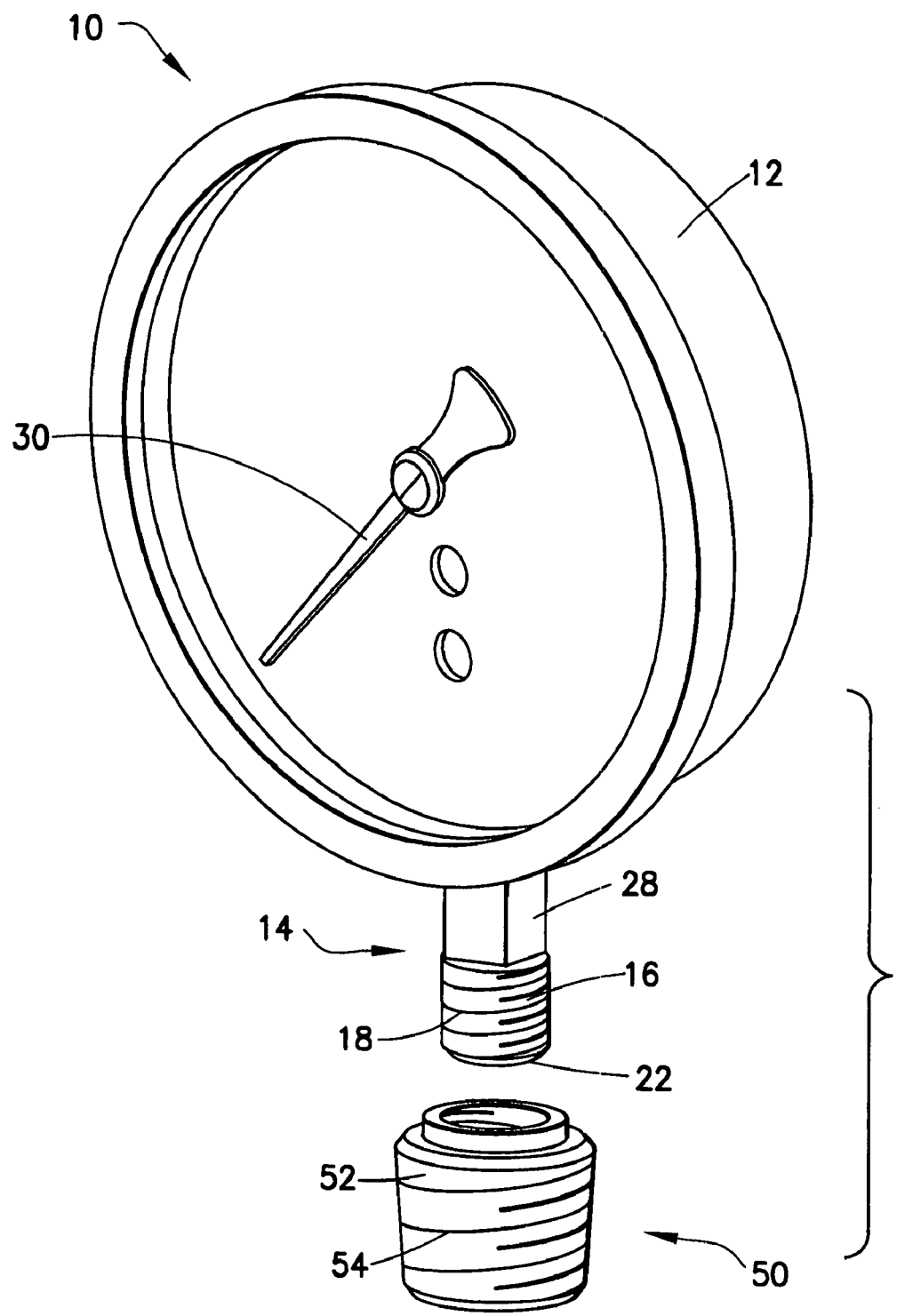
FIG. 1 is a frontal isometric view of an exemplary embodiment of a measuring device and adapter fitting according to the present disclosure, before assembly.

In the description which follows, like parts are marked throughout the specification and drawings with the same reference numerals, respectively. Drawing figures are not necessarily to scale and in certain views, parts may have been exaggerated for purposes of clarity.

Referring now to the drawings, and in, particular to FIG. 1, there is illustrated in one embodiment a measuring device 10 having a case 12 interfitting with a socket fitting 14 having a threaded stem 16 for mounting the measuring device into a threaded aperture (not shown) from which measurements are to be obtained. For example, measuring device 10 may be a pressure measuring device, including, but not limited to, a pressure gauge, a pressure transducer or the like. In another embodiment, measuring device 10 is a temperature measuring device. However, pressure or temperature measuring devices are not the only measuring devices that could be used in accordance with the principles of the present disclosure, as will be readily apparent to persons skilled in the art from the description provided herein.

External threads 18 of threaded stem 16 enable the connection of the socket fitting 14 into a threaded aperture associated with a vessel, reactor or other system from which (or for which) measurements are to be obtained. For example, socket fitting 14 may be operatively coupled to a container such as a tank, a pipe, a pressurized reactor or the like. In one embodiment, the external threads 18 of threaded stem 16 are ¼ inch NPT threads. The central section of the socket fitting 14 is normally provided with one or more flat areas 28 for receiving and/or interacting with a wrench to facilitate the coupling and uncoupling of the measuring device 10 with respect to a vessel, reactor or other system.

Figure 3:
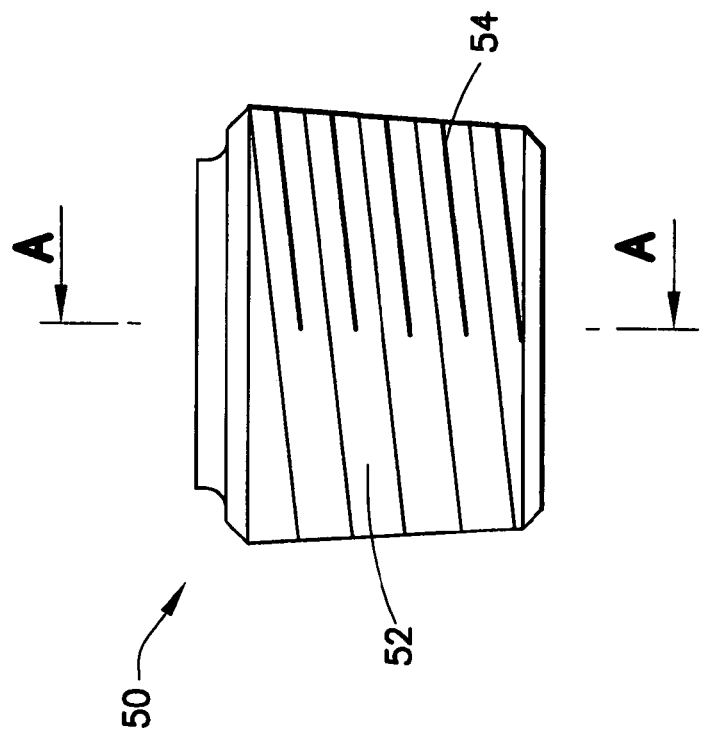
FIG. 3 is a front elevation view of an exemplary embodiment of an adapter fitting according to the present disclosure.

The threaded stem 16 of socket fitting 14 further includes an outward end 22. Also shown in FIGS. 1 and 3 is adapter fitting 50, which includes threaded portion 52 having external threads 54. In one embodiment, external threads 54 of adapter fitting 50 are ½ inch NPT threads.

Figure 2:
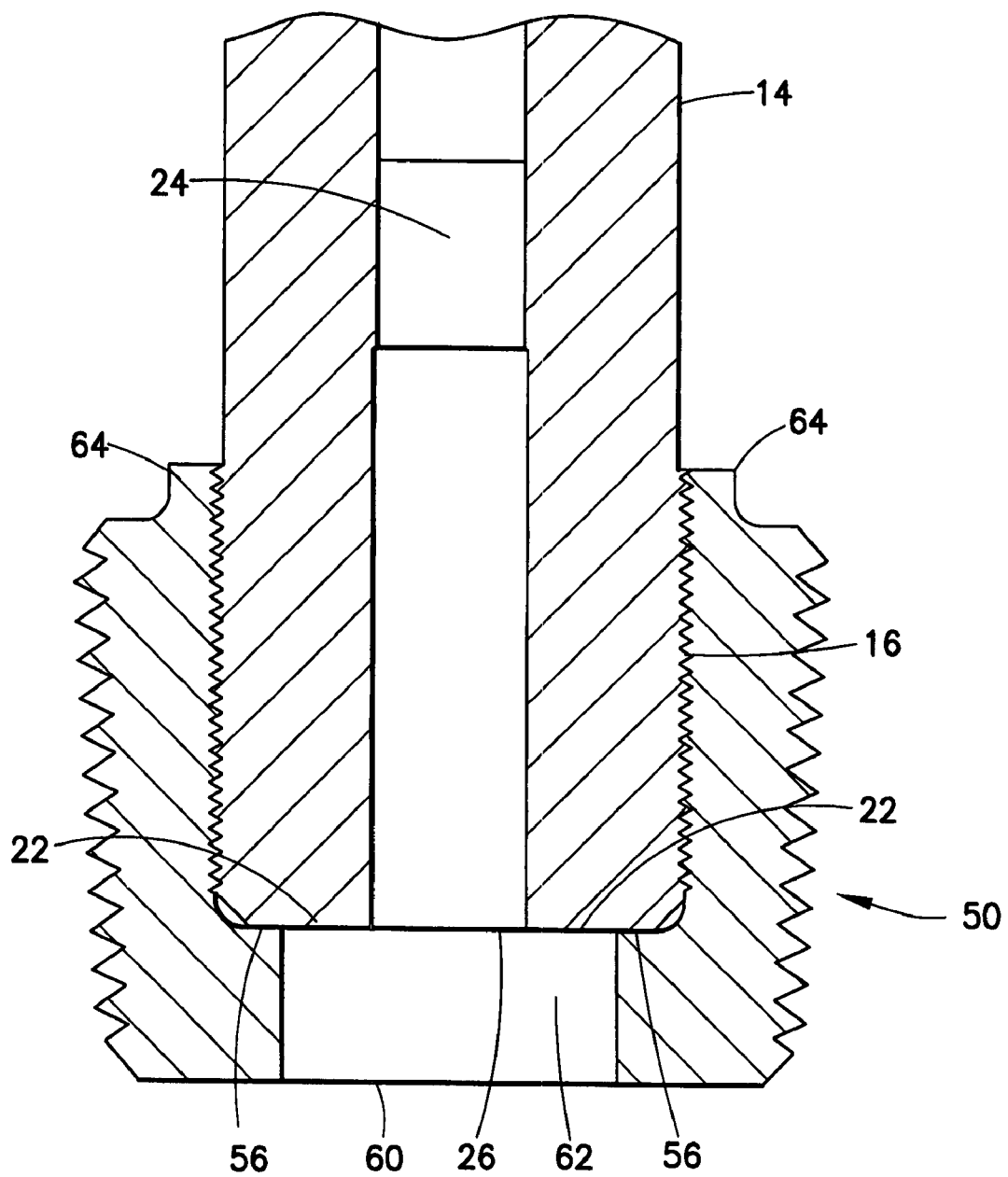
FIG. 2 is a sectioned view of an exemplary embodiment of a socket fitting and adapter fitting assembly hereof.
Figure 4:
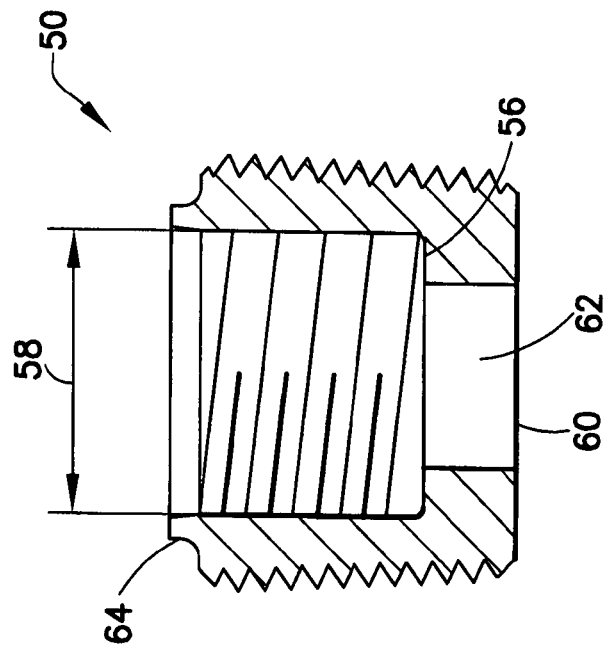
FIG. 4 is a sectional elevation view taken substantially along the lines A-A of FIG. 3 according to the present disclosure.

With reference to FIG. 2, adapter fitting 50 is shown positioned around the threaded stem 16 of socket fitting 14. As can be seen in FIGS. 2 and 4, adapter fitting 50 is constructed to define an opening 58 (FIG. 4) that is sized to receive the threaded stem 16 of socket fitting 14. In one embodiment, opening 58 is a cylindrical opening.

In one embodiment, adapter fitting 50 is slip-fit over threaded stem 16, where the threaded stem 16 is inserted into opening 58, or opening 58 is positioned around threaded stem 16, until the outward end 22 of the threaded stem 16 abuts the abutment face 56 of adapter fitting 50. In an alternative embodiment, adapter fitting 50 includes internal threads (not shown) that threadably engage with the external threads 18 of threaded stem 16 when adapter fitting 50 is positioned around the threaded stem 16, where the adapter fitting 50 screws on threaded stem 16 until outward end 22 of the threaded stem abuts the abutment face 56 of adapter fitting 50.

The adapter fitting 50 as shown in FIGS. 2 and 4 further includes an adapter inlet 60 to adapter bore 62. In one embodiment, adapter bore 62 is cylindrical.

As can be seen in FIG. 2, when adapter fitting 50 is positioned around the threaded stem 16 of socket fitting 14 until the outward end 22 of the threaded stem 16 abuts the abutment face 56 of adapter fitting 50, adapter bore 62 allows a condition to be measured, whether it be temperature, pressure or some other value, by passing/sensing through adapter bore 62 and socket inlet opening 26 into socket bore 24. In one embodiment, socket bore 24 is cylindrical. Socket bore 24 extends within socket fitting 14 from the inlet opening 26 to the measuring device mechanism, such as, for example, a Bourden tube or the like. In one embodiment, an indicator 30 is mounted on the measuring device 10, typically for rotation about the central axis of the measuring device to an angular position representative of the value measured by the measuring device, whether it be pressure, temperature or some other condition. The actual elements of the measuring device mechanism are not shown as they are conventional and do not form a part of the present disclosure.

In one embodiment, as can be seen in FIGS. 2 and 4, adapter fitting also includes a weld joint 64. In one embodiment, as can be seen in FIG. 2, when adapter fitting 50 is positioned around the threaded stem 16 of socket fitting 14 until the outward end 22 of the threaded stem 16 abuts the abutment face 56 of adapter fitting 50, the area of contact between the weld joint 64 and the socket fitting 14 adjacent the most inward portion of the weld joint 64 constitutes the line to be welded. Weld joint 64 of adapter fitting 50 is welded to socket fitting 14. After welding, a bead (not shown) is typically formed along the line between the welded parts.

In an alternative embodiment, when adapter fitting 50 is positioned around the threaded stem 16 of socket fitting 14 until the outward end 22 of the threaded stem 16 abuts the abutment face 56 of adapter fitting 50, the area of contact between the abutment face 56 and the outward end 22 of socket fitting 14 adjacent the most inward portion of the abutment face 56 constitutes an additional line to be welded. Abutment face 56 of adapter fitting 50 is welded to socket fitting 14. After welding, a bead (not shown) is typically formed along the line between the welded parts. In one embodiment, weld joint 64 of adapter fitting 50 is welded to socket fitting 14 before abutment face 56 of adapter fitting 50 is welded to socket fitting 14. In another embodiment, abutment face 56 of adapter fitting 50 is welded to socket fitting 14 before weld joint 64 of adapter fitting 50 is welded to socket fitting 14. When weld joint 64 of adapter fitting 50 is welded to socket fitting 14, and abutment face 56 of adapter fitting 50 is welded to socket fitting 14, there is an improvement in strength (burst pressure and under torque) of the welded adapter assembly, compared to an adapter assembly having just weld joint 64 welded to socket fitting 14, or compared to an adapter assembly having just abutment face 56 welded to socket fitting 14.

The process of welding is generally a metal joining process wherein coalescence is produced by heating to suitable temperatures to melt together the base metals with or without the addition of filler metal. If filler metal is used, it typically has a melting point and composition approximately the same as the base metal. Some variations of the welding process are brazing and soldering. Brazing is a metal joining process wherein coalescence is produced by use of nonferrous filler metal having a melting point of above 800° Fahrenheit (425° Centigrade), but lower than that of the base metals joined. Soldering is a metal joining process wherein coalescence is produced by heating to suitable temperature and by using a nonferrous alloy fusible at temperatures below 800° Fahrenheit (425° Centigrade) and having a melting point below that of the base metals being joined.

Typically, welding without a filler or insert material minimizes the cost of coupling the pieces by eliminating one element from both the process as well as the final product. Welding without a filler or insert material also reduces the method steps and technical skills required on the part of the person performing the welding. Welding without a filler or insert material also renders the process more susceptible to being carried out automatically or semi-automatically. As such, welding without a filler or insert material is generally preferred whenever possible or technically feasible.

In one embodiment of the present disclosure, weld joint 64 of adapter fitting 50 is welded to socket fitting 14 without the use of a filler or insert material. In another embodiment, weld joint 64 of adapter fitting 50 is welded to socket fitting 14 without the use of a filler or insert material, and abutment face 56 of adapter fitting 50 is welded to socket fitting 14 without the use of a filler or insert material. In another embodiment, weld joint 64 of adapter fitting 50 is welded to socket fitting 14 without the use of a filler or insert material utilizing Tungsten Inert Gas ("TIG") welding. In another embodiment, weld joint 64 of adapter fitting 50 is welded to socket fitting 14 without the use of a filler or insert material utilizing Tungsten Inert Gas ("TIG") welding, and abutment face 56 of adapter fitting 50 is welded to socket fitting 14 without the use of a filler or insert material utilizing Tungsten Inert Gas ("TIG") welding.

In one embodiment, welding of the parts is effected by supporting the case 12, socket fitting 14, and/or the adapter fitting 50, either by hand or in an appropriate fixture or fixtures (not shown), to mechanically retain the components in their final desired orientation. If utilized, supporting fixtures generally require no special care to provide heat dissipating properties or characteristics other than what is normal in the welding art.

The present disclosure provides for a welding device to be placed adjacent to the line of contact between the parts to be welded. In one embodiment, a commercially available gas tungsten arc welder (also known as a tungsten inert gas ("TIG") welder) (not shown), with a covering mixture of about 75% helium and about 25% argon is placed closely adjacent to the line of contact between the parts to be welded. The settings for the welding device or mechanisms in terms of gas ratios, pressure control ratios, envelope regulation control, etc., are all within the typical operating parameters of arc-welders as commercially available. The adjustment of the settings are within the normal skill of a person skilled in the welding art as a function of the parts to be welded. Motion is then effected between the welding device and the parts to be welded. For example, the motion can be effected by hand or by mechanically rotating the fixtures and supported pieces to sequentially and continuously present the weld line to the welding device.

During the welding process the welding mechanisms and fixtures, if utilized, will continuously cause sequential portions of the metal pieces to become molten through the application of thermal energy, heat, by the welding device. A continuous puddling and intermixing of the materials results to effect an intermolecular bond upon cooling. The weld will be characterized by having but a single weld line corresponding to the line of contact between the parts being welded. If a filler or insert material were utilized, a cross-sectional cut of the metal pieces and weld would reveal two, rather than one, weld lines. The above-described method is readily adaptable for manual, semi-automatic or automatic welding.

Tests have been made to demonstrate that the weld achieved in accordance with the present disclosure are satisfactory. In one embodiment, after welding, the measuring device with the adapter fitting 50 welded to the socket fitting 14 was able to seal the media in the socket fitting 14 without leaks. In addition, a safe burst pressure was achieved after welding, as the weld held without rupture at 75,000 psi. At 75,000 psi, the threaded joints between the adapter fitting 50 and the threaded aperture from which measurements are to be obtained started to fail, and there was no failure from the welded adapter fitting 50.

It should be understood, however, that other types of welding devices, such as, for example, commercially available resistance welding devices, could be used instead of the TIG welding device.

In another embodiment of the present disclosure, at least one gasketing material (not shown) is placed on the threaded stem 16, so that when adapter fitting 50 is positioned around the threaded stem 16 of socket fitting 14 until the outward end 22 of the threaded stem 16 abuts the abutment face 56 of adapter fitting 50, the gasketing material forms an additional seal between the adapter fitting 50 and the threaded stem 16. In one embodiment, the gasketing material is an O-ring.

One advantage to at least one embodiment of the present disclosure is that there are fewer features that have to be machined into the adapter fitting 50 as compared to a complete socket. Therefore, there is generally less machining time required to machine the adapter fitting as compared to a complete socket, thereby providing a cost advantage as the result. In addition, instead of requiring the typical measuring device manufacturer to maintain an inventory of the same products with different socket fittings for several different types of thread sizes, the present disclosure provides for an adapter fitting to be positioned around a socket fitting, thereby reducing the inventory requirements of manufacturers and suppliers and providing a significant commercial advantage as a result.

Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the invention.

What is claimed is:

1. A measuring device system comprising:
    a first fitting of a measuring device that includes a stem;
    a second fitting defining an opening sized to receive the first fitting, the second fitting defining an abutment face;
    wherein the stem of the first fitting is directly and operatively coupled to a first aperture of a first external vessel so that the measuring device obtains measurements from a process media associated with the first external vessel when: (i) the second fitting is not positioned around and secured to the first fitting, and (ii) the second fitting is not operatively coupled to the first external vessel; and
    wherein the second fitting is: (i) positioned around the first fitting with the abutment face abutting an outward end of the first fitting, (ii) secured to the first fitting via at least one weld, and (iii) directly and operatively coupled to a second aperture of a second external vessel so that the measuring device obtains measurements from a process media associated with the second external vessel when the second fitting is positioned around and secured to the first fitting.

2. The measuring device system of claim 1, wherein the stem of the first fitting further comprises external threads.

3. The measuring device system of claim 2, wherein the second fitting further comprises internal threads that are configured and dimensioned to threadably engage with the external threads of the stem of the first fitting.

4. The measuring device system of claim 1, wherein the second fitting further comprises external threads.

5. The measuring device system of claim 1, wherein the at least one weld securing the first fitting to the second fitting is caused by Tungsten Inert Gas ("TIG") welding.

6. The measuring device system of claim 1, wherein the at least one weld securing the first fitting to the second fitting is caused by welding without a filler or insert material operatively associated with the weld.

7. The measuring device system of claim 1, wherein the measuring device is a pressure measuring device.

8. The measuring device system of claim 1, wherein the measuring device is a temperature measuring device.

9. The measuring device system of claim 1, wherein the stem further comprises a gasket, and wherein the gasket forms a seal between the first fitting and the second fitting when the second fitting is positioned around and secured to the first fitting.

10. The measuring device system of claim 9, wherein the gasket is an O-ring.

11. A measuring device system comprising:
    a first fitting of a measuring device that includes a stem, the stem including external threads;
    a second fitting defining a cylindrical opening sized to receive the first fitting, the second fitting defining an abutment face, and wherein the second fitting includes external threads;
    wherein the stem of the first fitting is directly and operatively coupled to a first aperture of a first external vessel so that the measuring device obtains measurements from a process media associated with the first external vessel when: (i) the second fitting is not positioned around and secured to the first fitting, and (ii) the second fitting is not operatively coupled to the first external vessel; and
    wherein the second fitting is: (i) positioned around the first fitting with the abutment face abutting an outward end of the first fitting, (ii) secured to the first fitting via at least one weld, and (iii) directly and operatively coupled to a second aperture of a second external vessel so that the measuring device obtains measurements from a process media associated with the second external vessel when the second fitting is positioned around and secured to the first fitting.

12. The measuring device system of claim 11, wherein the external threads of the stem are ¼ inch NPT threads, and wherein the external threads of the second fitting are ½ inch NPT threads.

* * * * *